(12) United States Patent
Matsuo et al.

(10) Patent No.: US 10,399,263 B2
(45) Date of Patent: Sep. 3, 2019

(54) INJECTION MOLDING CELL AND INJECTION MOLDING CELL MANAGEMENT SYSTEM

(71) Applicant: FANUC Corporation, Yamanashi (JP)

(72) Inventors: Akimasa Matsuo, Yamanashi (JP); Tatsuhiro Uchiyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 272 days.

(21) Appl. No.: 15/426,301

(22) Filed: Feb. 7, 2017

(65) Prior Publication Data

US 2017/0225376 A1   Aug. 10, 2017

(30) Foreign Application Priority Data

Feb. 8, 2016 (JP) .................................. 2016-022194

(51) Int. Cl.
  *B29C 45/76* (2006.01)
  *G06F 21/31* (2013.01)
  (Continued)

(52) U.S. Cl.
  CPC .............. *B29C 45/76* (2013.01); *B29C 45/03* (2013.01); *G06F 21/31* (2013.01);
  (Continued)

(58) Field of Classification Search
  CPC .................... B29C 45/76; B29C 45/03; B29C 2945/76652; B29C 2945/76173; G06F 21/31; G06F 21/6218; G06F 2221/2149
  See application file for complete search history.

(56) References Cited

U.S. PATENT DOCUMENTS 5,216,617 A  *  6/1993  Kamiguchi ........... B29C 45/766
                                                      425/135
5,870,698 A  *  2/1999  Riedel .................. G05B 19/406
                                                          700/1
(Continued)

FOREIGN PATENT DOCUMENTS

AT        005752 U1   11/2002
AT        501786 B1    1/2007
(Continued)

OTHER PUBLICATIONS

Office Action in JP Application No. 2016-022194, dated Jan. 9, 2018, 8 pp.

(Continued)

*Primary Examiner* — Joseph S Del Sole
*Assistant Examiner* — Jerzi H Moreno Hernandez
(74) *Attorney, Agent, or Firm* — Hauptman Ham, LLP (57) ABSTRACT

An injection molding cell management system includes a plurality of injection molding cell each having an injection molding machine, its peripheral device and an injection molding cell management unit and a host management unit. The injection molding cell management unit includes a worker identification information input unit, which accepts input of worker identification information for identifying a worker who performs input and/or operation of the injection molding machine and its peripheral device, and a prohibition state releasing unit which releases a prohibition state of the input and/or operation of the injection molding machine and its peripheral device, based on the worker identification.

12 Claims, 7 Drawing Sheets

(51) Int. Cl.
*B29C 45/03* (2006.01)
*G06Q 10/10* (2012.01)
*G06F 21/62* (2013.01)

(52) U.S. Cl.
CPC ....... *G06F 21/6218* (2013.01); *G06Q 10/105* (2013.01); *B29C 2945/76173* (2013.01); *B29C 2945/76652* (2013.01); *G06F 2221/2149* (2013.01)

(56) References Cited

U.S. PATENT DOCUMENTS

| | | | | |
|---|---|---|---|---|
| 2003/0075818 | A1* | 4/2003 | Morwald | B29C 45/76 264/40.1 |
| 2004/0044434 | A1* | 3/2004 | Morimura | B29C 45/76 700/197 |
| 2004/0088066 | A1* | 5/2004 | Yamazaki | G05B 19/409 700/95 |
| 2007/0106420 | A1* | 5/2007 | Wyrwoll | B29C 45/76 700/200 |
| 2010/0079250 | A1 | 4/2010 | Fukushima | |
| 2010/0332018 | A1* | 12/2010 | Chen | B29C 45/76 700/201 |
| 2011/0160895 | A1* | 6/2011 | Chen | B29C 45/76 700/200 |
| 2011/0230995 | A1 | 9/2011 | Irwin et al. | |
| 2012/0116547 | A1* | 5/2012 | Shigehara | G05B 19/0428 700/83 |
| 2014/0370139 | A1 | 12/2014 | Horiuchi | |
| 2018/0165438 | A1* | 6/2018 | Ogino | G05B 19/41815 |

FOREIGN PATENT DOCUMENTS

| | | | |
|---|---|---|---|
| JP | 5-42576 | A | 2/1993 |
| JP | 7-240357 | A | 9/1995 |
| JP | 2000313043 | A | 11/2000 |
| JP | 2002-144392 | A | 5/2002 |
| JP | 2002127218 | A | 5/2002 |
| JP | 2004-287564 | A | 10/2004 |
| JP | 2007-55016 | A | 3/2007 |
| JP | 2010-79731 | A | 4/2010 |
| JP | 2012079209 | A * | 4/2012 |
| JP | 2012243046 | A | 12/2012 |
| JP | 2014-199637 | A | 10/2014 |

OTHER PUBLICATIONS

Office Action in DE Application No. 102017000906.6, dated Oct. 2, 2018, 11 pp.

* cited by examiner

FIG.2

| WORKER IDENTIFICATION INFORMATION | WHETHER INPUT OR OPERATION OF DEVICES IN INJECTION MOLDING CELL IS ALLOWED (PROHIBITION-STATE RELEASE AUTHORIZATION INFORMATION) | | | |
|---|---|---|---|---|
| | INJECTION MOLDING MACHINE | MOLDING TAKE-OUT MACHINE | MOLD TEMPERATURE CONTROLLER | RESIN DRYER |
| WORKER A | INPUT/OPERATION IS ALLOWED | INPUT/OPERATION IS ALLOWED | INPUT/OPERATION IS ALLOWED | INPUT/OPERATION IS ALLOWED |
| WORKER B | INPUT/OPERATION IS ALLOWED | INPUT/OPERATION IS ALLOWED | INPUT IS PROHIBITED/ OPERATION IS ALLOWED | INPUT IS PROHIBITED/ OPERATION IS ALLOWED |
| WORKER C | INPUT/OPERATION IS ALLOWED | INPUT/OPERATION IS PROHIBITED | INPUT/OPERATION IS PROHIBITED | INPUT/OPERATION IS PROHIBITED |
| WORKER D | INPUT IS PROHIBITED/ OPERATION IS ALLOWED | INPUT IS PROHIBITED/ OPERATION IS ALLOWED | INPUT IS PROHIBITED/ OPERATION IS ALLOWED | INPUT IS PROHIBITED/ OPERATION IS ALLOWED |
| WORKER E | INPUT/OPERATION IS PROHIBITED | INPUT/OPERATION IS PROHIBITED | INPUT/OPERATION IS PROHIBITED | INPUT/OPERATION IS PROHIBITED |

| INJECTION MOLDING CELL IDENTIFICATION INFORMATION | WORKER IDENTIFICATION INFORMATION | INPUT AUTHORIZATION AND OPERATION AUTHORIZATION OF DEVICES IN INJECTION MOLDING CELL (PROHIBITION-STATE RELEASE AUTHORIZATION INFORMATION) | | | |
|---|---|---|---|---|---|
| | | INJECTION MOLDING MACHINE | MOLDING TAKE-OUT MACHINE | MOLD TEMPERATURE CONTROLLER | RESIN DRYER |
| INJECTION MOLDING CELL(1) | WORKER A | INPUT/OPERATION IS ALLOWED | INPUT/OPERATION IS ALLOWED | INPUT/OPERATION IS ALLOWED | INPUT/OPERATION IS ALLOWED |
| | WORKER B | INPUT/OPERATION IS ALLOWED | INPUT/OPERATION IS ALLOWED | INPUT IS PROHIBITED / OPERATION IS ALLOWED | INPUT IS PROHIBITED / OPERATION IS ALLOWED |
| | WORKER C | INPUT/OPERATION IS ALLOWED | INPUT/OPERATION IS PROHIBITED | INPUT/OPERATION IS PROHIBITED | INPUT/OPERATION IS PROHIBITED |
| | WORKER D | INPUT IS PROHIBITED / OPERATION IS ALLOWED | INPUT IS PROHIBITED / OPERATION IS ALLOWED | INPUT IS PROHIBITED / OPERATION IS ALLOWED | INPUT IS PROHIBITED / OPERATION IS ALLOWED |
| | WORKER E | INPUT/OPERATION IS PROHIBITED | INPUT/OPERATION IS PROHIBITED | INPUT/OPERATION IS PROHIBITED | INPUT/OPERATION IS PROHIBITED |
| INJECTION MOLDING CELL(2) | WORKER A | INPUT/OPERATION IS ALLOWED | INPUT/OPERATION IS ALLOWED | INPUT/OPERATION IS ALLOWED | INPUT/OPERATION IS ALLOWED |
| | WORKER B | INPUT/OPERATION IS ALLOWED | INPUT/OPERATION IS ALLOWED | INPUT/OPERATION IS ALLOWED | INPUT/OPERATION IS ALLOWED |
| | WORKER C | INPUT/OPERATION IS ALLOWED | INPUT/OPERATION IS ALLOWED | INPUT/OPERATION IS ALLOWED | INPUT/OPERATION IS ALLOWED |
| | WORKER D | INPUT/OPERATION IS ALLOWED | INPUT/OPERATION IS ALLOWED | INPUT/OPERATION IS ALLOWED | INPUT/OPERATION IS ALLOWED |
| | WORKER E | INPUT/OPERATION IS ALLOWED | INPUT/OPERATION IS ALLOWED | INPUT/OPERATION IS ALLOWED | INPUT/OPERATION IS ALLOWED |
| INJECTION MOLDING CELL(N) | WORKER A | INPUT/OPERATION IS ALLOWED | INPUT/OPERATION IS ALLOWED | INPUT/OPERATION IS ALLOWED | INPUT/OPERATION IS ALLOWED |
| | WORKER B | INPUT/OPERATION IS ALLOWED | INPUT/OPERATION IS ALLOWED | INPUT/OPERATION IS ALLOWED | INPUT/OPERATION IS ALLOWED |
| | WORKER C | INPUT/OPERATION IS ALLOWED | INPUT/OPERATION IS ALLOWED | INPUT/OPERATION IS ALLOWED | INPUT/OPERATION IS ALLOWED |
| | WORKER D | INPUT/OPERATION IS PROHIBITED | INPUT/OPERATION IS PROHIBITED | INPUT/OPERATION IS PROHIBITED | INPUT/OPERATION IS PROHIBITED |
| | WORKER E | INPUT/OPERATION IS PROHIBITED | INPUT/OPERATION IS PROHIBITED | INPUT/OPERATION IS PROHIBITED | INPUT/OPERATION IS PROHIBITED |

| WORKER IDENTIFICATION INFORMATION | INPUT AUTHORIZATION/OPERATION AUTHORIZATION (PROHIBITION-STATE RELEASE AUTHORIZATION INFORMATION) | | | | |
|---|---|---|---|---|---|
| | INPUT 1 | ... | INPUT n | OPERATION 1 | ... | OPERATION m |
| WORKER A | INPUT/OPERATION IS ALLOWED | | INPUT/OPERATION IS ALLOWED | INPUT/OPERATION IS ALLOWED | | INPUT/OPERATION IS ALLOWED |
| WORKER B | INPUT/OPERATION IS ALLOWED | | INPUT IS ALLOWED / OPERATION IS PROHIBITED | INPUT IS PROHIBITED / OPERATION IS ALLOWED | | INPUT/OPERATION IS PROHIBITED |
| WORKER C | INPUT/OPERATION IS ALLOWED | | INPUT/OPERATION IS PROHIBITED | INPUT/OPERATION IS PROHIBITED | | INPUT/OPERATION IS PROHIBITED |
| WORKER D | INPUT IS PROHIBITED / OPERATION IS ALLOWED | | INPUT IS PROHIBITED / OPERATION IS ALLOWED | INPUT IS PROHIBITED / OPERATION IS ALLOWED | | INPUT IS PROHIBITED / OPERATION IS ALLOWED |
| WORKER E | INPUT/OPERATION IS PROHIBITED | | INPUT/OPERATION IS PROHIBITED | INPUT/OPERATION IS PROHIBITED | | INPUT/OPERATION IS PROHIBITED |

INJECTION MOLDING CELL AND INJECTION MOLDING CELL MANAGEMENT SYSTEM

RELATED APPLICATIONS

The present application claims priority to Japanese Patent Application Number 2016-022194, filed Feb. 8, 2016, the disclosure of which is hereby incorporated by reference herein in its entirety.

BACKGROUND OF THE INVENTION

Field of the Invention

The present invention relates to means for releasing an input/operation prohibition state for the case in which setting change or operation of devices in an injection molding cell comprising an injection molding machine and its peripheral devices is performed.

Description of the Related Art

In injection molding, moldings are manufactured by a single injection molding cell that is formed of peripheral devices, such as a molding take-out machine, mold temperature controller, and resin dryer, as well as an injection molding machine. Moreover, in order to allow only a specific worker to perform setting change or operation for each of the devices, including the injection molding machine and the molding take-out machine, which constitute the injection molding cell, the injection molding cell is provided with an input lock function or an operation lock function, based on worker identification information from a storage medium, such as a smart card, or a password.

As a prior art technique for identifying a worker for an injection molding machine of this type, Japanese Patent Application Laid-Open No. 2000-313043 discloses a data protection method for the injection molding machine in which a molding condition setting function of the injection molding machine is locked by a password. Moreover, Japanese Patent Application Laid-Open No. 2002-127218 describes a system in which a person permitted for operation by a password can operate a take-out machine. Furthermore, Japanese Patent Application Laid-Open No. 2012-243046 describes how to connect a plurality of production facilities, each including a production machine, fingerprint authentication unit, and control unit, to a fingerprint authentication server through a network so that the fingerprint authentication server may make the production machine operable depending on the level of an operator.

If only a specific worker is allowed to perform setting change or operation of the injection molding machine and its peripheral devices, it is necessary to release an input/operation prohibition state for each of the injection molding machine and the peripheral devices. Therefore, the worker must perform an operation to release the input/operation prohibition state for each of the injection molding machine and the peripheral devices in the injection molding cell although they are all constituent elements of the injection molding cell, so that a complicated work is required. Moreover, since a method for the prohibition state release operation varies depending on the devices, there is also a problem that the worker must learn the release operation method for each device.

In Japanese Patent Application Laid-Open No. 2012-243046 described above, the fingerprint authentication unit must be provided for each production facility, so that the resulting authentication system is expensive. Moreover, as in the cases of the other prior art techniques, the operation for releasing the input/operation prohibition state must be performed for each device, thus entailing a complicated work.

SUMMARY OF THE INVENTION

Accordingly, the object of the present invention is to provide an injection molding cell and an injection molding cell management system configured to enable a worker to easily release a prohibition state of an injection molding machine and its peripheral device.

In an injection molding cell comprising an injection molding machine and its peripheral device and an injection molding cell management unit configured to manage the same, according to the present invention, the injection molding cell management unit solves the above-described problems by including a releasing means configured to determine the release authorization of a prohibition state of input and/or operation of the injection molding machine in the injection molding cell and its peripheral device, based on worker identification information input by a storage medium, such as a smart card, or a password in a worker identification information input unit.

An injection molding cell according to the present invention comprises an injection molding machine, a peripheral device of the injection molding machine, and an injection molding cell management unit configured to manage the injection molding machine and the peripheral device of the injection molding machine. The injection molding cell management unit comprises a worker identification information input unit, configured to accept input of worker identification information for identifying a worker who performs input and/or operation of the injection molding machine and the peripheral device of the injection molding machine, and a prohibition state releasing unit configured to release a prohibition state of the input and/or operation of the injection molding machine and the peripheral device of the injection molding machine, based on the worker identification information.

The worker identification information may be information for identifying the worker who performs the input and operation of the injection molding machine and the peripheral device of the injection molding machine in the injection molding cell, work contents of the worker, qualification of the worker, or role of the worker.

The injection molding cell may further comprise a storage unit configured to store prohibition-state release authorization information in which the release authorization of the input/operation prohibition state of the injection molding machine and the peripheral device of the injection molding machine in the injection molding cell is set for each piece of the worker identification information, and the prohibition state releasing unit may check the release authorization of the prohibition state of the injection molding machine and the peripheral device of the injection molding machine in the injection molding cell, based on the worker identification information input from the worker identification information input unit and the prohibition-state release authorization information stored in the storage unit.

The worker identification information input unit may accept input of prohibition-state release authorization information in which the release authorization of the input/operation prohibition state of the injection molding machine and the peripheral device of the injection molding machine in the injection molding cell is set, and the prohibition state releasing unit may check the release authorization of the prohibition state of the injection molding machine and the peripheral device of the injection molding machine in the injection molding cell, based on the worker identification information and the prohibition-state release authorization information input from the worker identification information input unit.

The prohibition state releasing unit may collectively check the release authorization of the prohibition state for all of the injection molding machine and the peripheral device of the injection molding machine, based on the worker identification information and the prohibition-state release authorization information.

The prohibition state releasing unit may check the release authorization of the prohibition state for each of the injection molding machine and the peripheral device of the injection molding machine, based on the worker identification information and the prohibition-state release authorization information.

Input authorization and operation authorization for each of input items and operation items of the injection molding machine and the peripheral device of the injection molding machine in the injection molding cell may be set for each piece of the worker identification information in the prohibition-state release authorization information, and the prohibition state releasing unit may determine the input authorization and the operation authorization for each of the input items and the operation items of the injection molding machine and the peripheral device of the injection molding machine, based on the worker identification information and the prohibition-state release authorization information.

An injection molding cell management system according to the present invention comprises a plurality of injection molding cells, each comprising an injection molding machine, a peripheral device of the injection molding machine, and an injection molding cell management unit configured to manage the injection molding machine and the peripheral device of the injection molding machine, and a host management unit configured to perform centralized management of the plurality of injection molding cells. The injection molding cell management unit comprises a worker identification information input unit configured to accept input of worker identification information for identifying a worker who performs input and operation of the injection molding machine and the peripheral device of the injection molding machine and transmit the worker identification information to the host management unit. On the other hand, the host management unit comprises a prohibition state releasing unit configured to release a prohibition state of the input and/or operation of the injection molding machine in the injection molding cell corresponding to injection molding cell identification information for identifying the injection molding cell having transmitted the worker identification information and the peripheral device of the injection molding machine, based on the worker identification information and the injection molding cell identification information.

The worker identification information may be information for identifying the worker who performs the input and operation of the injection molding machine and the peripheral device of the injection molding machine in the injection molding cell, work contents of the worker, qualification of the worker, or role of the worker.

The host management unit may further comprise a storage unit configured to store prohibition-state release authorization information in which the release authorization of the input/operation prohibition state of the injection molding machine and the peripheral device of the injection molding machine in the injection molding cell is set for each piece of the worker identification information, and the prohibition state releasing unit may check the release authorization of the prohibition state of the injection molding machine and the peripheral device of the injection molding machine in the injection molding cell, based on the worker identification information input from the worker identification information input unit, the injection molding cell identification information for identifying the injection molding cell having transmitted the worker identification information, and the prohibition-state release authorization information stored in the storage unit.

The worker identification information input unit may accept input of prohibition-state release authorization information in which the release authorization of the input/operation prohibition state of the injection molding machine and the peripheral device of the injection molding machine in the injection molding cell is set and transmit the prohibition-state release authorization information to the host management unit, and the prohibition state releasing unit may check the release authorization of the prohibition state of the injection molding machine and the peripheral device of the injection molding machine in the injection molding cell, based on the worker identification information and the prohibition-state release authorization information, input from the worker identification information input unit, and the injection molding cell identification information for identifying the injection molding cell having transmitted the worker identification information and the prohibition-state release authorization information.

The prohibition state releasing unit may collectively check the release authorization of the prohibition state for all of the injection molding machine and the peripheral device of the injection molding machine, based on the worker identification information, the prohibition-state release authorization information, and the injection molding cell identification information.

The prohibition state releasing unit may check the release authorization of the prohibition state for each of the injection molding machine and the peripheral device of the injection molding machine, based on the worker identification information, the prohibition-state release authorization information, and the injection molding cell identification information.

Input authorization and operation authorization for each of input items and operation items of the injection molding machine and the peripheral device of the injection molding machine in the injection molding cell may be set for each piece of the worker identification information in the prohibition-state release authorization information, and the prohibition state releasing unit may determine the input authorization and the operation authorization for each of the input items and the operation items of the injection molding machine and the peripheral device of the injection molding machine, based on the worker identification information, the prohibition-state release authorization information, and the injection molding cell identification information.

According to the present invention, an operation for releasing setting and operation prohibition states of injection molding machines in injection molding cells and their peripheral devices can be performed on a single releasing means, so that it is unnecessary to perform the release operation by operating a human-machine interface (HMI) such as a screen for each of the injection molding machines and their peripheral devices. Moreover, the prohibition state release operation need not be learned for each of the injection molding machines and their peripheral devices, so that the operation authorization is improved.

BRIEF DESCRIPTION OF THE DRAWINGS

FIG. 4 is a diagram showing an example of prohibition-state release authorization information according to the second embodiment of the present invention;

DETAILED DESCRIPTION OF THE PREFERRED EMBODIMENTS

Figure 1:
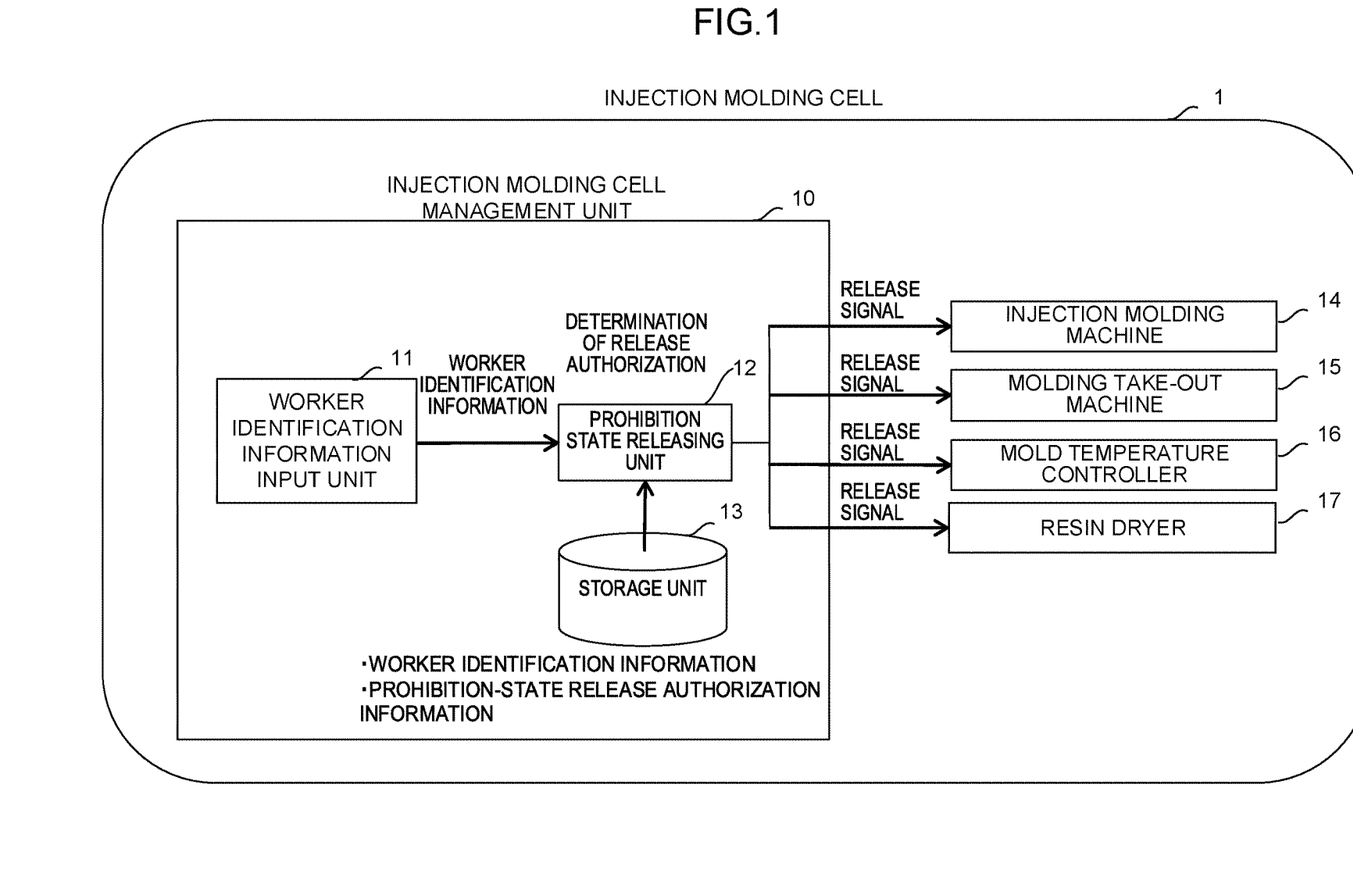
FIG. 1 is a schematic configuration diagram of an injection molding cell according to a first embodiment of the present invention.

FIG. 1 is a schematic configuration diagram of an injection molding cell according to a first embodiment of the present invention.

An injection molding cell 1 comprises an injection molding machine 14 and its peripheral devices, such as a molding take-out machine 15, mold temperature controller 16, and resin dryer 17, and an injection molding cell management unit 10 configured to manage the injection molding machine 14 and the peripheral devices. In the injection molding cell 1 shown in FIG. 1, a molding is formed as a predetermined amount of resin, dried by the resin dryer 17 and melted by the injection molding machine 14, is injected into a mold which is attached to the injection molding machine 14 and of which temperature is controlled by the mold temperature controller 16. The formed molding is taken out of the mold attached to the injection molding machine 14 by the molding take-out machine 15.

The injection molding machine 14 and the peripheral devices, such as the molding take-out machine 15, mold temperature controller 16, and resin dryer 17, included in the injection molding cell 1, are set to be in an input/operation prohibition state by a prohibition state setting unit (not shown) so that a third person cannot arbitrarily perform setting change or operation at the time of their startup or when a worker leaves the injection molding cell. The prohibition state setting unit may be configured so that the injection molding machine 14 and its peripheral devices can be set to be in the input/operation prohibition state by the worker's manual command, for example. Alternatively, the prohibition state setting unit may be configured to automatically set the injection molding machine 14 and its peripheral devices to be in the input/operation prohibition state after the lapse of a predetermined non-operating time or when the worker's leaving from the injection molding cell is detected. The prohibition state setting unit may be provided on each of HMIs, such as screens, of the injection molding machine 14 and its peripheral devices or attached to the injection molding cell management unit 10 so that the injection molding machine 14 and its peripheral devices can be set to be in the input/operation prohibition state in a centralized manner.

A worker identification information input unit 11 accepts input of worker identification information from the worker and outputs the accepted worker identification information to a prohibition state releasing unit 12 when the injection molding machine 14 and the peripheral devices, including the molding take-out machine 15, mold temperature controller 16, and resin dryer 17, are in the operation prohibition state. The worker identification information input unit 11 may be configured to accept a password input through a keyboard (not shown) by the worker as the worker identification information or to accept the worker identification information from a storage medium, such as a magnetic card or smart card, carried by the worker with him/her through a card reader (not shown). Moreover, the worker identification information input unit 11 may be any means that allows input of information on the worker, such as a barcode reader, visual input means, voice input means, wireless or wired input through a mobile device, or the like.

The prohibition state releasing unit 12 checks the release authorization of the input/operation prohibition state with reference to prohibition-state release authorization information previously stored in a storage unit 13, based on the worker identification information accepted from the worker identification information input unit 11. If the prohibition state releasing unit 12 determines that the release is authorized, it outputs a release signal for releasing the input/operation prohibition state to the injection molding machine 14 and its peripheral devices in the injection molding cell 1. The prohibition state releasing unit 12 may be configured to collectively determine the release authorization of the input/operation prohibition state for all of the injection molding machine 14 and its peripheral devices or to determine the release authorization of the input/operation prohibition state for each of the injection molding machine 14 and its peripheral devices according to the worker identification information.

Figure 2:
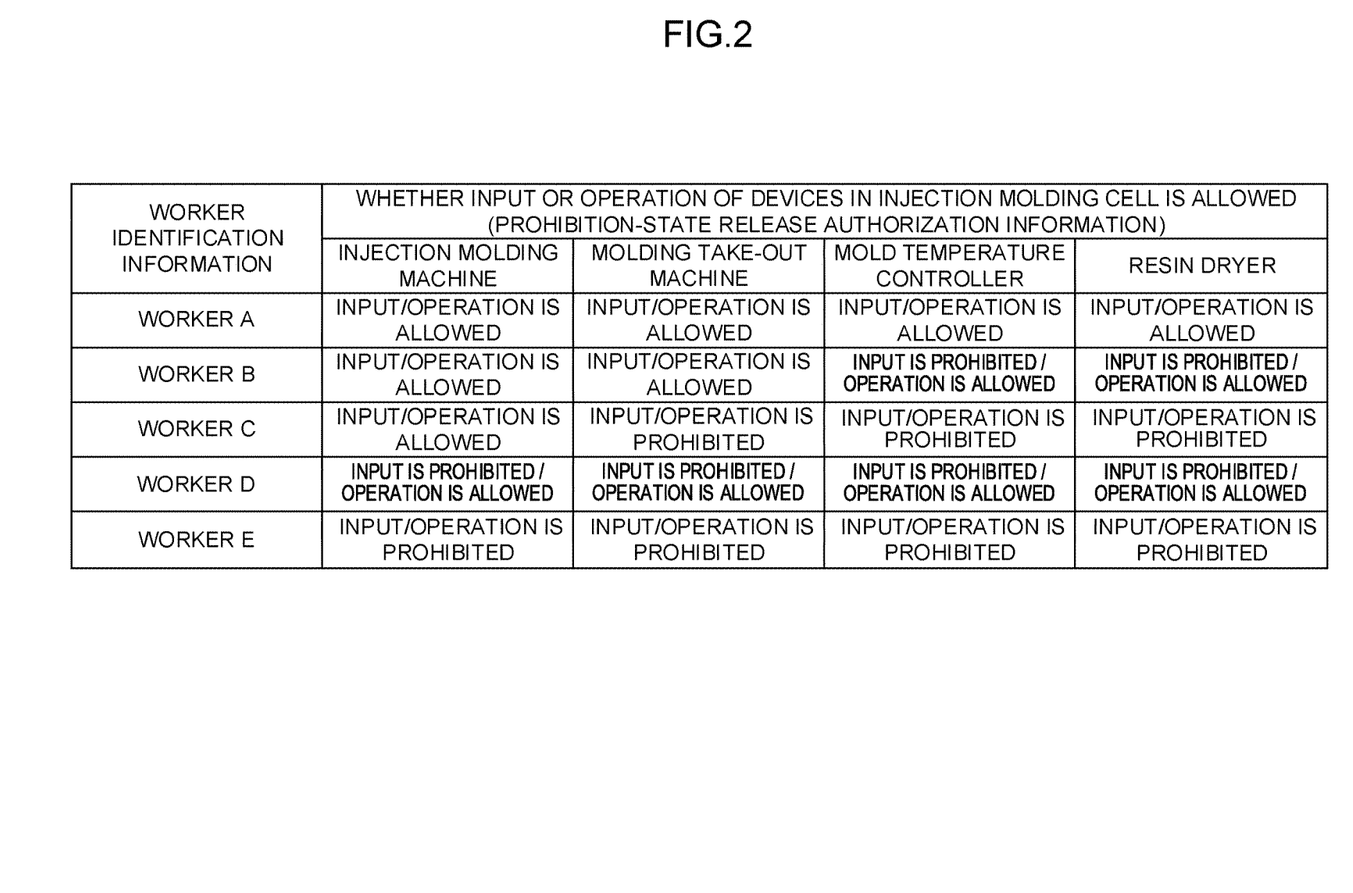
FIG. 2 is a diagram showing an example of prohibition-state release authorization information according to the first embodiment of the present invention.

FIG. 2 is a diagram showing an example of the prohibition-state release authorization information previously stored in the storage unit 13.

As shown in FIG. 2, the prohibition-state release authorization information is information based on the worker identification information associated with input authorization and operation authorization for each of the injection molding machine and its peripheral devices. The prohibition-state release authorization information may be manually created and registered in the storage unit 13 by a manager who manages the worker's work or may be automatically created based on the worker's work schedule by a system for managing the work schedule or the like and registered in the storage unit 13 through a network (not shown).

In the example of FIG. 2, a worker A, for example, is allowed to release the input/operation prohibition state for all of the injection molding machine 14, molding take-out machine 15, mold temperature controller 16, and resin dryer 17, while a worker C is allowed to release the input/operation prohibition state for the injection molding machine 14 but is not allowed to do so for the peripheral devices. In the case in which such prohibition-state release authorization information is stored, if the password of the worker C is input as the worker identification information from the worker identification information input unit 11 or if a smart card that identifies the worker C is read, the prohibition state releasing unit 12 determines that the input/ operation prohibition state of the injection molding machine 14 has to be released for the worker C, with reference to the prohibition-state release authorization information shown in FIG. 2, and outputs the release signal for releasing the input/operation prohibition state to the injection molding machine 14.

According to the injection molding cell 1 of the first embodiment with the configuration described above, when the worker inputs his/her own worker identification information through the keyboard or card reader attached to the injection molding cell management unit 10, the input/operation prohibition state of the injection molding machine 14 and its peripheral devices is released within the range of the work authority of the worker registered in the prohibition-state release authorization information. Therefore, the worker need not perform a release operation by operating the HMI, such as the screen, for each of the injection molding machine 14 and its peripheral devices. Moreover, the worker need not learn the prohibition state release operation for each of the injection molding machine 14 and its peripheral devices, so that the worker's operability is improved.

Figure 3:
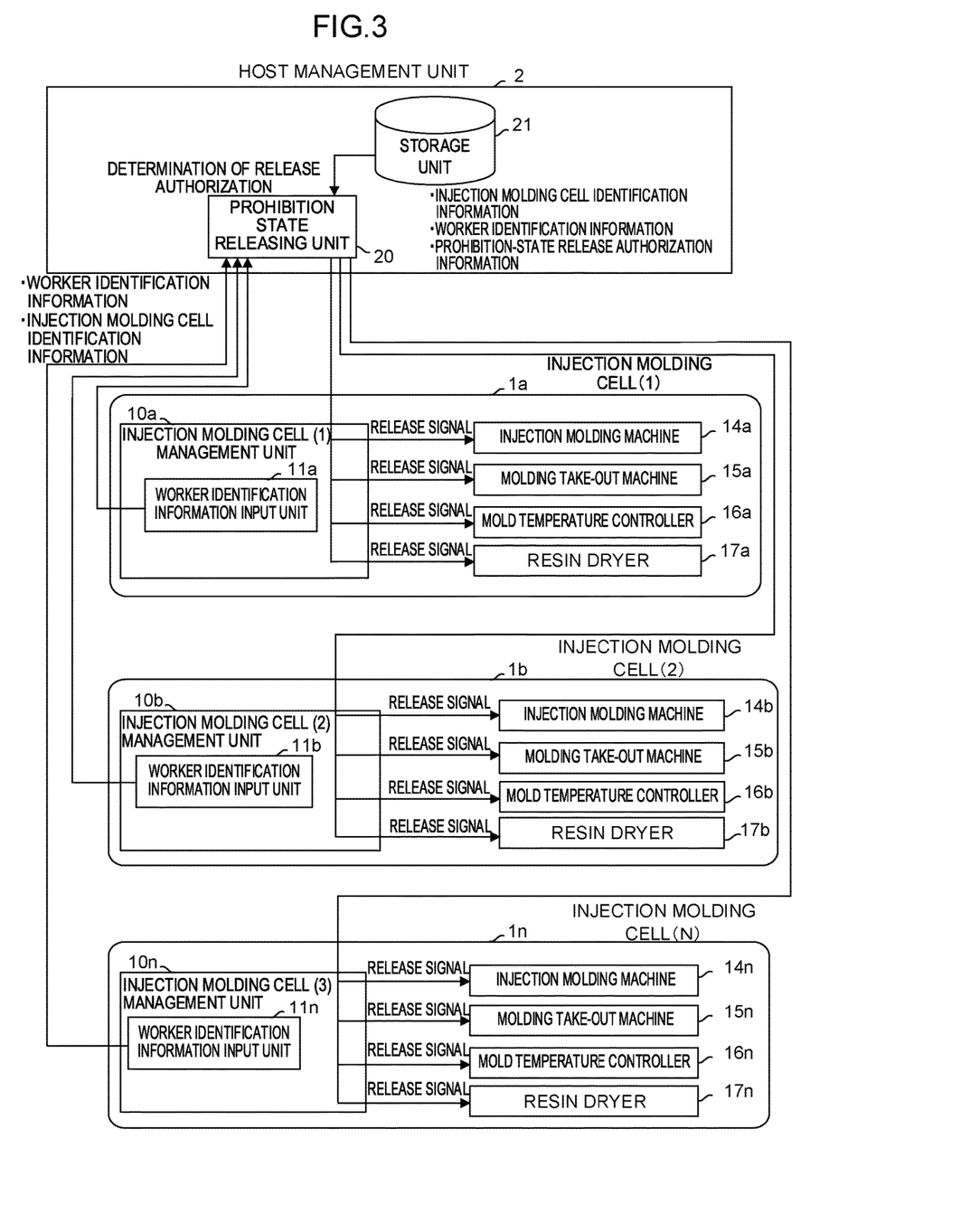
FIG. 3 is a schematic configuration diagram of an injection molding cell management system according to a second embodiment of the present invention.

FIG. 3 is a schematic configuration diagram of an injection molding cell management system according to a second embodiment of the present invention, including a plurality of injection molding cells and a host management unit for managing the injection molding cells.

The injection molding cells 1 (injection molding cell 1a, injection molding cell 1b, . . . ) are constructed in the same manner as the injection molding cell 1 described in connection with the first embodiment except that injection molding cell management units 10 (injection molding cell management unit 10a, injection molding cell management unit 10b, . . . ) comprise neither prohibition state releasing units 12 (prohibition state releasing unit 12a, prohibition state releasing unit 12b, . . . ) nor storage units 13 (storage unit 13a, storage unit 13b, . . . ) in which the prohibition-state release authorization information is stored.

A host management unit 2 is a device that performs centralized management of the input/operation prohibition state of the individual injection molding cells 1a, 1b, . . . . The host management unit 2 is connected to the injection molding cells to be managed through a wired or wireless communication means, and comprises a prohibition state releasing unit 20 for releasing the input/operation prohibition state of the individual injection molding cells 1a, 1b, . . . and a storage unit 21 in which the prohibition-state release authorization information on the individual injection molding cells 1a, 1b, . . . is stored.

The prohibition state releasing unit 20 accepts the worker identification information from respective worker identification information input units 11a, 11b, . . . of the injection molding cells 1a, 1b, . . . , together with identification information on the injection molding cells, and checks the release authorization of the input/operation prohibition state with reference to the prohibition-state release authorization information previously stored in the storage unit 21, based on the accepted injection molding cell identification information and worker identification information. If the prohibition state releasing unit 20 determines that the release is authorized, it outputs release signals for releasing the input/operation prohibition state to the injection molding machines and their peripheral devices in the injection molding cells.

The prohibition state releasing unit 20 may be configured to collectively determine the release authorization of the input/operation prohibition state for all of injection molding machines 14a, 14b, . . . and their peripheral devices or to determine the release authorization of the input/operation prohibition state for each of the injection molding machines 14a, 14b, . . . and their peripheral devices according to the worker identification information and the prohibition-state release authorization information.

The release signals output by the prohibition state releasing unit 20 may be output directly from the host management unit 2 to the injection molding machines 14a, 14b, . . . and their peripheral devices in the injection molding cells. Alternatively, the injection molding cell management units 10a, 10b, . . . may be configured to receive the release signals from the host management unit 2 and output the received release signals to the injection molding machines 14a, 14b, . . . and their peripheral devices in the injection molding cells individually managed thereby.

FIG. 4 is a diagram showing an example of the prohibition-state release authorization information previously stored in the storage unit 21.

As shown in FIG. 4, the prohibition-state release authorization information of the present embodiment is information based on the worker identification information associated with input authorization and operation authorization for each of the injection molding machine and its peripheral devices, for each identification information on the injection molding cell to be managed. The prohibition-state release authorization information may be manually created and registered in the storage unit 13 by the manager who manages the worker's work or automatically created based on the worker's work schedule by the system for managing the work schedule or the like and registered in the storage unit 13 through the network (not shown).

In the example of FIG. 4, a worker E, for example, is allowed to release the input/operation prohibition state for all of the injection molding machine 14, molding take-out machine 15, mold temperature controller 16, and resin dryer 17 in an injection molding cell (2), while the same worker E is not allowed to do so for all of the injection molding machine 14 and its peripheral devices in injection molding cells (1) and (3). In the case in which such prohibition-state release authorization information is stored, if the password of the worker E is input as the worker identification information from the worker identification information input unit 1ib of the injection molding cell (2)1b or if a smart card that identifies the worker E is read, the prohibition state releasing unit 20 determines that the input/operation prohibition state of the injection molding machine 14b has to be released for the worker E, with reference to the prohibition-state release authorization information shown in FIG. 4, and outputs the release signal for releasing the input/operation prohibition state to the injection molding machine 14b. However, if the password of the worker E is input as the worker identification information from the worker identification information input unit 11a of the injection molding cell (1)1a or if the smart card that identifies the worker E is read, the prohibition state releasing unit 20 determines that the input/operation prohibition state of the injection molding machine 14b must not be released for the worker E, with reference to the prohibition-state release authorization information shown in FIG. 4, so that the prohibition state continues without the output of the release signal for releasing the input/operation prohibition state to the injection molding machine 14b.

In the injection molding cell management system according to the second embodiment of the present invention with the configuration described above, the prohibition-state release authorization information on the injection molding cells 1a, 1b, . . . can be managed in a centralized manner, so that the worker's operation authorization is improved, as in the first embodiment, and the cost of management by the work manager can be reduced.

While embodiments of the present invention have been described herein, the invention is not limited to the above-described embodiments and may be suitably modified and embodied in various forms.

Figure 5:
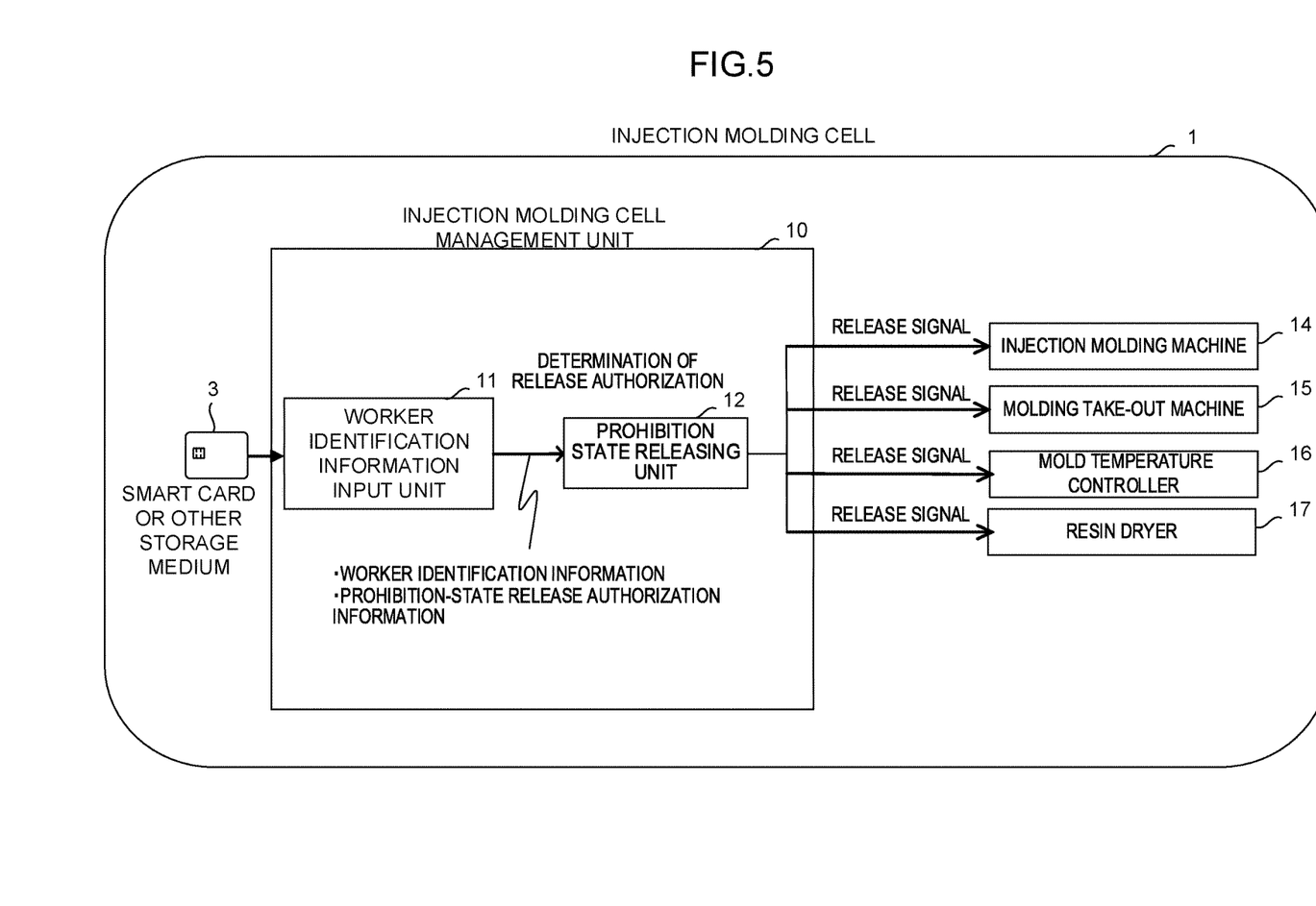
FIG. 5 is a schematic configuration diagram of an injection molding cell according to an alternative embodiment of the present invention.
Figure 6:
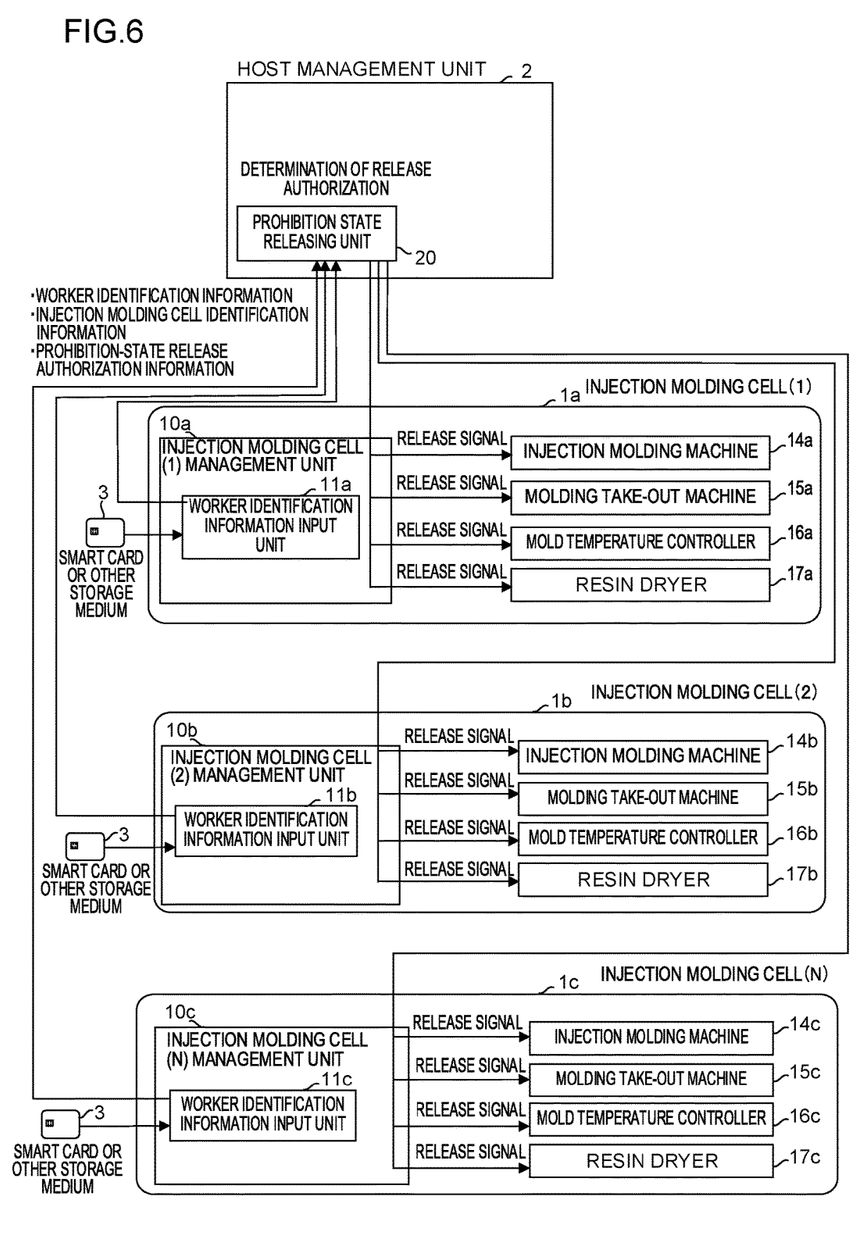
FIG. 6 is a schematic configuration diagram of an injection molding cell management system according to the alternative embodiment of the present invention.

For example, in the above-described embodiments, the prohibition-state release authorization information is stored in the storage unit 13 of the injection molding cell management unit 10 or the storage unit 21 of the host management unit 2. However, if the system is configured so that the worker identification information input units 11 (worker identification information input units 11*a*, 11*b*, . . . ) accept the input of the worker identification information from the storage medium, such as a smart card, with a fixed storage capacity carried by the worker with him/her, as shown in FIG. 5 or 6, the prohibition-state release authorization information may be previously stored together with the worker identification information in a storage medium 3 carried by the worker with him/her so that the prohibition state releasing unit 12 or 20 can make a decision on the release of the input/operation prohibition state, based on the worker identification information and the prohibition-state release authorization information input from the storage medium. In this way, the work manager is enabled to manage the worker by issuing a smart card for the worker or rewriting data.

Moreover, in the above-described embodiments, the worker identification information has been explained as such information as the name or employee number of the worker for identifying each individual worker. Alternatively, however, the worker identification information may be assumed to be information for identifying the work contents, qualification, and role of the worker, such as an operator or manager. In this case, the release authorization of the input/operation prohibition state should only be set in the prohibition-state release authorization information in accordance with the work contents, qualification, and role.

Figure 7:
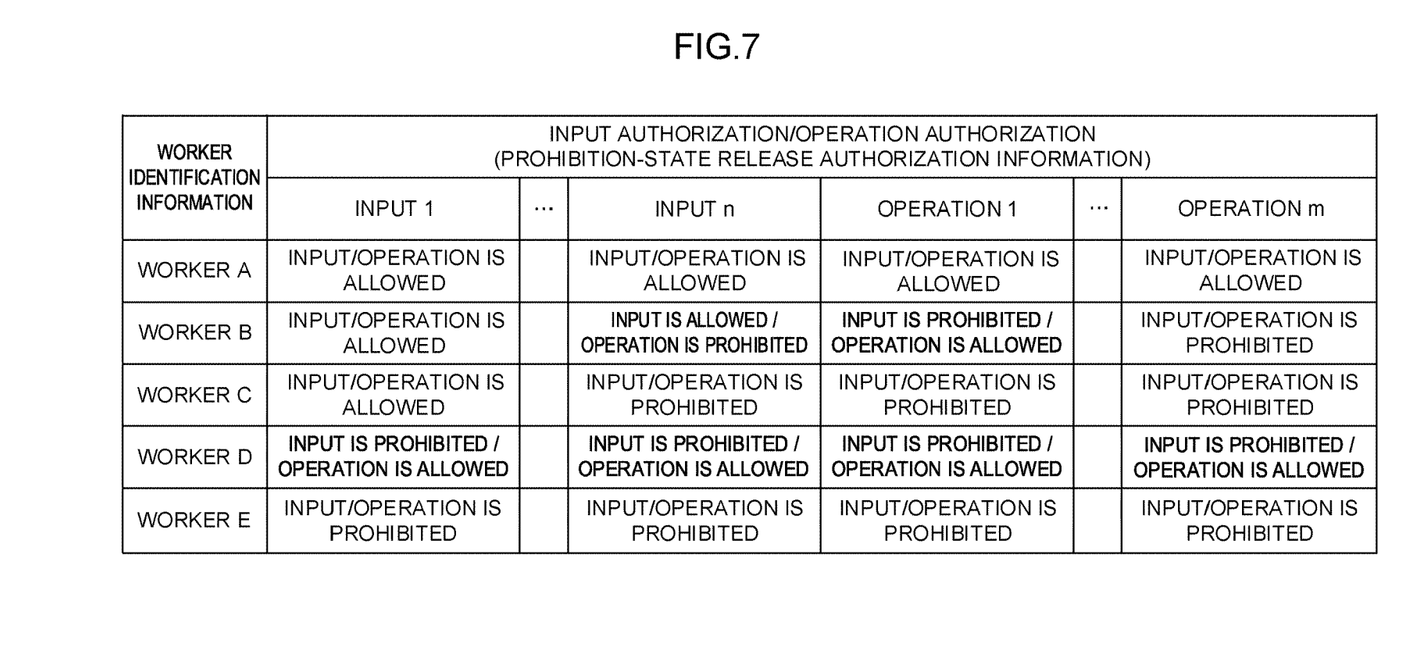
FIG. 7 is a diagram showing an example of prohibition-state release authorization information according to the alternative embodiment of the present invention.

As a further application, as shown in FIG. 7, it is possible to prohibit an input and operation by each of workers in each of the injection molding cells, for each of input and operation items of the injection molding machine and its peripheral devices in the injection molding cell, if the information on the input/operation authorization for each of the input and operation items is previously set in each injection molding cell, as the prohibition-state release authorization information, in association with the worker identification information.

The invention claimed is:

1. An injection molding cell management system, comprising:
   a plurality of injection molding cells, each comprising
      an injection molding machine,
      a peripheral device of the injection molding machine, and
      a computer configured to manage the injection molding machine and the peripheral device of the injection molding machine; and
   a host computer configured to perform centralized management of the plurality of injection molding cells, the host computer being connected to the computer through a wired or wireless communication,
   wherein the computer comprises
      a worker identification information input unit configured to
         accept input of worker identification information for identifying a worker who performs input and operation of the injection molding machine and the peripheral device of the injection molding machine, and
         transmit the worker identification information to the host computer,
   wherein the host computer comprises
      a processor configured to
         receive the worker identification information from the computer,
         receive prohibition-state release authorization information, and
         release a prohibition state of the input and the operation of both the injection molding machine and the peripheral device of the injection molding machine in the injection molding cell corresponding to injection molding cell identification information, which is obtained from the computer of each of the plurality of injection molding cells, for identifying the injection molding cell having transmitted the worker identification information, based on
            (1) the worker identification information,
            (2) the injection molding cell identification information, and
            (3) the received prohibition-state release authorization information,
   wherein the processor is configured to collectively determine release authorization of the prohibition state for both of (1) the injection molding machine and (2) the peripheral device of the injection molding machine, based on the worker identification information, the prohibition-state release authorization information, and the injection molding cell identification information.

2. The injection molding cell management system according to claim 1, wherein the worker identification information is information for identifying
   the worker who performs the input and operation of the injection molding machine and the peripheral device of the injection molding machine in the injection molding cell,
   work contents of the worker,
   qualification of the worker, or
   role of the worker.

3. The injection molding cell management system according to claim 1, wherein the host computer further comprises a storage configured to store the prohibition-state release authorization information in which the release authorization of the prohibition state of the injection molding machine and the peripheral device of the injection molding machine in the injection molding cell is set for each piece of the worker identification information.

4. The injection molding cell management system according to claim 1, wherein
   the worker identification information input unit is configured to
      accept input of the prohibition-state release authorization information in which the release authorization of the prohibition state of the injection molding machine and the peripheral device of the injection molding machine in the injection molding cell is set, and
      transmit the prohibition-state release authorization information to the host computer, and
   the processor is configured to determine the release authorization of the prohibition state of the injection molding machine and the peripheral device of the injection molding machine in the injection molding cell, based on
the worker identification information and the prohibition-state release authorization information, input from the worker identification information input unit, and
the injection molding cell identification information for identifying the injection molding cell having transmitted the worker identification information and the prohibition-state release authorization information.

5. An injection molding cell management system comprising:
a plurality of injection molding cells, each comprising
an injection molding machine,
a peripheral device of the injection molding machine, and
a computer configured to manage the injection molding machine and the peripheral device of the injection molding machine; and
a host computer configured to perform centralized management of the plurality of injection molding cells, the host computer being connected to the computer through a wired or wireless communication,
wherein the computer comprises
a worker identification information input unit configured to
accept input of worker identification information for identifying a worker who performs input and operation of the injection molding machine and the peripheral device of the injection molding machine, and
transmit the worker identification information to the host computer,
wherein the host computer comprises
a processor configured to
receive the worker identification information from the computer,
receive prohibition-state release authorization information, and
release a prohibition state of the input and the operation of both the injection molding machine and the peripheral device of the injection molding machine in the injection molding cell corresponding to injection molding cell identification information, which is obtained from the computer of each of the plurality of injection molding cells, for identifying the injection molding cell having transmitted the worker identification information, based on
(1) the worker identification information,
(2) the injection molding cell identification information, and
(3) the received prohibition-state release authorization information,
wherein the processor is configured to determine release authorization of the prohibition state for each of (1)the injection molding machine and (2) the peripheral device of the injection molding machine, based on the worker identification information, the prohibition-state release authorization information, and the injection molding cell identification information.

6. The injection molding cell management system according to claim 5, wherein the worker identification information is information for identifying
the worker who performs the input and operation of the injection molding machine and the peripheral device of the injection molding machine in the injection molding cell,
work contents of the worker,
qualification of the worker, or
role of the worker.

7. The injection molding cell management system according to claim 5, wherein the host computer further comprises a storage configured to store the prohibition-state release authorization information in which the release authorization of the prohibition state of the injection molding machine and the peripheral device of the injection molding machine in the injection molding cell is set for each piece of the worker identification information.

8. The injection molding cell management system according to claim 5, wherein
the worker identification information input unit is configured to
accept input of the prohibition-state release authorization information in which the release authorization of the prohibition state of the injection molding machine and the peripheral device of the injection molding machine in the injection molding cell is set, and
transmit the prohibition-state release authorization information to the host computer, and
the processor is configured to determine the release authorization of the prohibition state of the injection molding machine and the peripheral device of the injection molding machine in the injection molding cell, based on
the worker identification information and the prohibition-state release authorization information, input from the worker identification information input unit, and
the injection molding cell identification information for identifying the injection molding cell having transmitted the worker identification information and the prohibition-state release authorization information.

9. An injection molding cell management system comprising:
a plurality of injection molding cells, each comprising
an injection molding machine,
a peripheral device of the injection molding machine, and
a computer configured to manage the injection molding machine and the peripheral device of the injection molding machine; and
a host computer configured to perform centralized management of the plurality of injection molding cells, the host computer being connected to the computer through a wired or wireless communication,
wherein the computer comprises
a worker identification information input unit configured to
accept input of worker identification information for identifying a worker who performs input and operation of the injection molding machine and the peripheral device of the injection molding machine, and
transmit the worker identification information to the host computer,
wherein the host computer comprises
a processor configured to
receive the worker identification information from the computer, receive prohibition-state release authorization information, and release a prohibition state of the input and the operation of both the injection molding machine and the peripheral device of the injection molding machine in the injection molding cell corresponding to injection molding cell identification information, which is obtained from the computer of each of the plurality of injection molding cells, for identifying the injection molding cell having transmitted the worker identification information, based on
- (1) the worker identification information,
- (2) the injection molding cell identification information, and
- (3) the received prohibition-state release authorization information, wherein input authorization and operation authorization for each of input items and operation items of the injection molding machine and the peripheral device of the injection molding machine in the injection molding cell are set for each piece of the worker identification information in the prohibition-state release authorization information, and the processor is configured to determine input authorization and operation authorization for each of (1) the input items and (2) the operation items of (a) the injection molding machine and (b) the peripheral device of the injection molding machine, based on the worker identification information, the prohibition-state release authorization information, and the injection molding cell identification information.

10. The injection molding cell management system according to claim 9, wherein the worker identification information is information for identifying the worker who performs the input and operation of the injection molding machine and the peripheral device of the injection molding machine in the injection molding cell, work contents of the worker, qualification of the worker, or role of the worker.

11. The injection molding cell management system according to claim 9, wherein the host computer further comprises a storage configured to store the prohibition-state release authorization information in which the release authorization of the prohibition state of the injection molding machine and the peripheral device of the injection molding machine in the injection molding cell is set for each piece of the worker identification information.

12. The injection molding cell management system according to claim 9, wherein the worker identification information input unit is configured to accept input of the prohibition-state release authorization information in which the release authorization of the prohibition state of the injection molding machine and the peripheral device of the injection molding machine in the injection molding cell is set, and transmit the prohibition-state release authorization information to the host computer, and the processor is configured to determine the release authorization of the prohibition state of the injection molding machine and the peripheral device of the injection molding machine in the injection molding cell, based on the worker identification information and the prohibition-state release authorization information, input from the worker identification information input unit, and the injection molding cell identification information for identifying the injection molding cell having transmitted the worker identification information and the prohibition-state release authorization information.

* * * * *